INVENTORS.
ESMOND P. G. WRIGHT
DONALD A. WEIR
BY RAYMOND C. P. HINTON
BORIS DZULA

Robert Harding
ATTORNEY

TIMING DIAGRAM

Inventor
E.P.G.WRIGHT-D.A.WEIR-
R.C.P.HINTON-B.DZULA
By [signature]
Attorney

United States Patent Office 3,130,387
Patented Apr. 21, 1964

3,130,387
BUFFER SYSTEM FOR TRANSFERRING DATA BETWEEN TWO ASYNCHRONOUS DATA STORES

Esmond Philip Goodwin Wright and Donald Adams Weir, London, England, and Raymond Cecil Price Hinton, Teaneck, and Boris Dzula, Clifton, N.J., assignors to International Standard Electric Corporation, New York, N.Y.

Filed Feb. 5, 1959, Ser. No. 791,499
Claims priority, application Great Britain Feb. 6, 1958
11 Claims. (Cl. 340—172.5)

This invention relates to data processing systems using more than one store.

A data processing system using a single storage device, such as a magnetic drum, can use conveniently "clock pulses" derived from the store, e.g. from a specially prepared track on the drum, to exercise a time control on other parts of the system. Small variations in speed of the drum are of no consequence as all parts vary to the same extent and at the same times.

With systems using two different drums or a combination of different forms of the store, e.g. magnetic drum and magnetic tape or wire, there is danger of loss of synchronism within the system owing to the difficulty of maintaining extremely close speed accuracy between the various stores.

One known solution is to employ a buffer store capable of holding a large block of intelligence, and which can be filled in synchronism with one time scale and emptied in synchronism with a second time scale. However, such an arrangement is apt to involve a considerable amount of apparatus, particularly if the amount of intelligence to be transferred at one time involves thousands of binary elements.

It is now proposed to achieve the same result with the use of a buffer store combined with the requirement that the receiving store has a slightly higher effective speed than the transmitting store, and according, therefore, to the present invention, there is provided a data processing system which comprises a first store and a second store of substantially the same operational speed, but with the proviso that the second store is always slightly faster than the first, cyclically operating time scales associated one with each store for controlling insertion into or retransmission from, their respective stores of items of intelligence, means including a buffer store for transferring items of intelligence continuously from said first store to said second store under the control of the respective time scales, and means for delaying transfer operations controlled by said second time scale for one complete cycle of said second time scale whenever said second time scale effectively overtakes said first time scale. This means that with a normal speed difference of, say, 1½% each rotating device can be allowed to vary from the normal by ½%.

The invention will be described with reference to the accompanying drawings illustrating a preferred embodiment of the application of such an arrangement to a storage system in which each item of intelligence needs five storage elements, and one item between elements is not used.

In the drawings:

FIG. 1 is a logical circuit diagram of the arrangement, while

Figure 1:
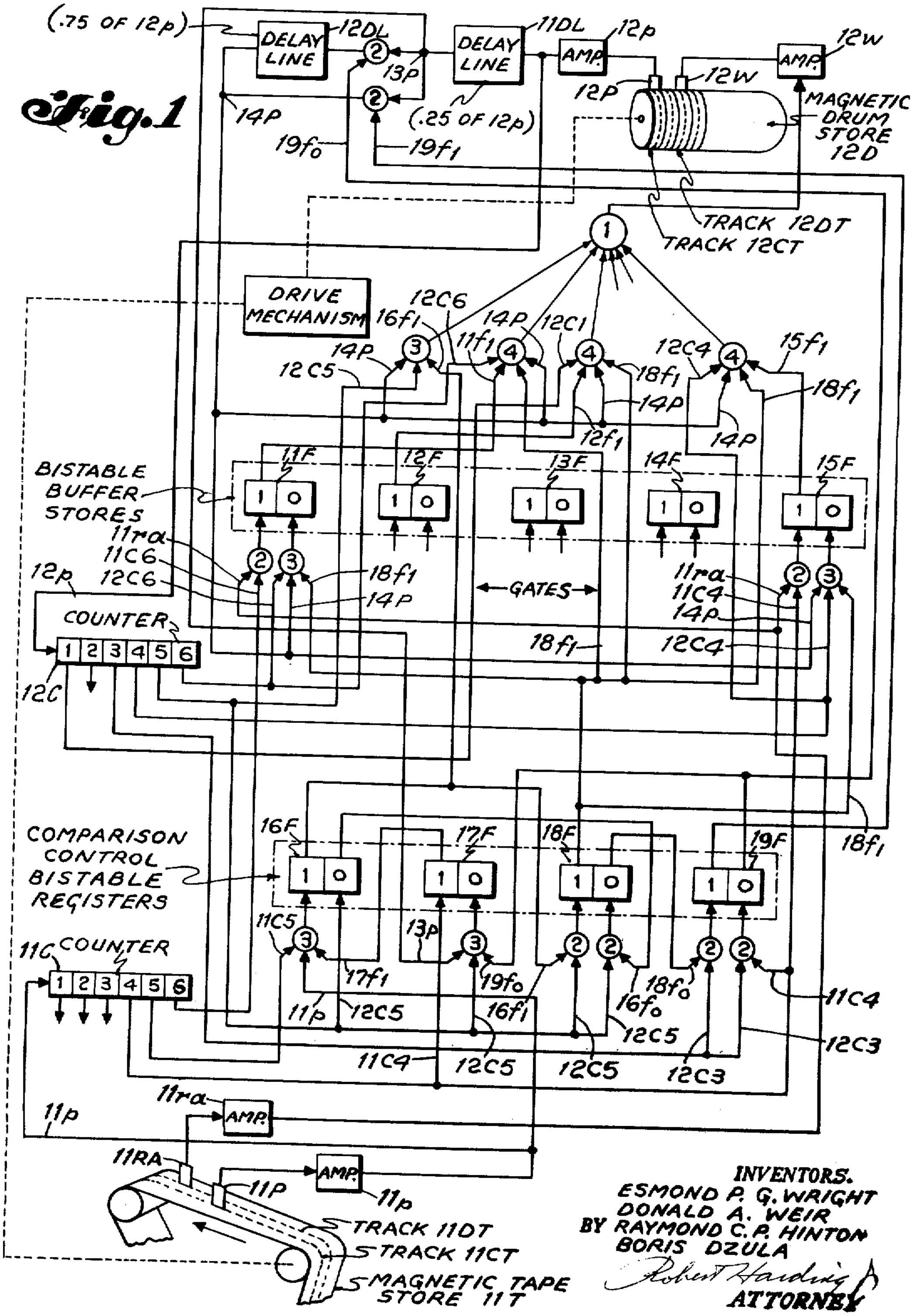

In the arrangement to be described, the incoming data is fed into a five-element buffer store under the control of a six-element counter driven from the clock pulses of the transmitting store e.g. a magnetic tape. The outgoing data is withdrawn from the same buffer store under the control of a second six-element counter driven from the clock pulses of the receiving store e.g. a magnetic drum. It is evident that from time to time the buffer will not be sufficiently filled to enable an item to be read out and in consequence a trigger is provided to recognise this condition and to prevent starting to transmit an item which will not be available in time. As a consequence there will be item positions in which nothing is inserted on the drum.

These empty positions can be marked by utilising the sixth-element not employed for data as a distributor element position associated with each item to state whether the following position is in use or not.

It will be appreciated that the receiving store needs to have slightly more capacity than the transmitting store to allow for the unused item positions. If the data is withdrawn from the drum item by item, it is not essential that the items are in adjacent positions and it is only necessary that a distributor indicates these items in sequence.

Such a situation as that described above and taken to its limit is revealed in U.S. Patent No. 2,932,688, issued to E. P. G. Wright, J. Rice, and J. D. Reynolds on April 12, 1960, where the speed ratio is 1:1000 (i.e. line speed of 50 baud, drum speed of 50 kcs.), and the incoming characters are staticised one by one on a buffer store and transferred during the inter-character pause to a marked position on a specific drum track, the drum rotating unused for many rotations during the reception of each character. In this case, the speed difference is so great that the problem dealt with in the present application does not arise, and the buffer store will be filled always before any attempt is made to empty it. Moreover, there is so much time to spare (relatively speaking) between the filling of the buffer store in this prior case and the need to start filling it again with the next received character, that it is possible to wait until the drum is properly located before transferring the presently stored character, so that character spaces are filled in turn round the track.

In the present invention, the conditions are almost exactly reversed. The two stores, as stated, are almost of the same speed, and transfer takes place practically without interruption, only now and again being held up to allow a character from the slower store to accumulate fully, a process which leads to occasional gaps in the recording on the drum track (the faster store), which is otherwise filled up, character space by character space, round the track. In the subsequent retransmission from the drum track out to the line, the enormous reduction in speed encountered renders the gaps of no account, and the process employed is that of the prior specification referred to.

Thus, the present invention deals mainly with a problem encountered within an exchange employing a high-speed cross-office transfer link of mixed character.

Figure 2:
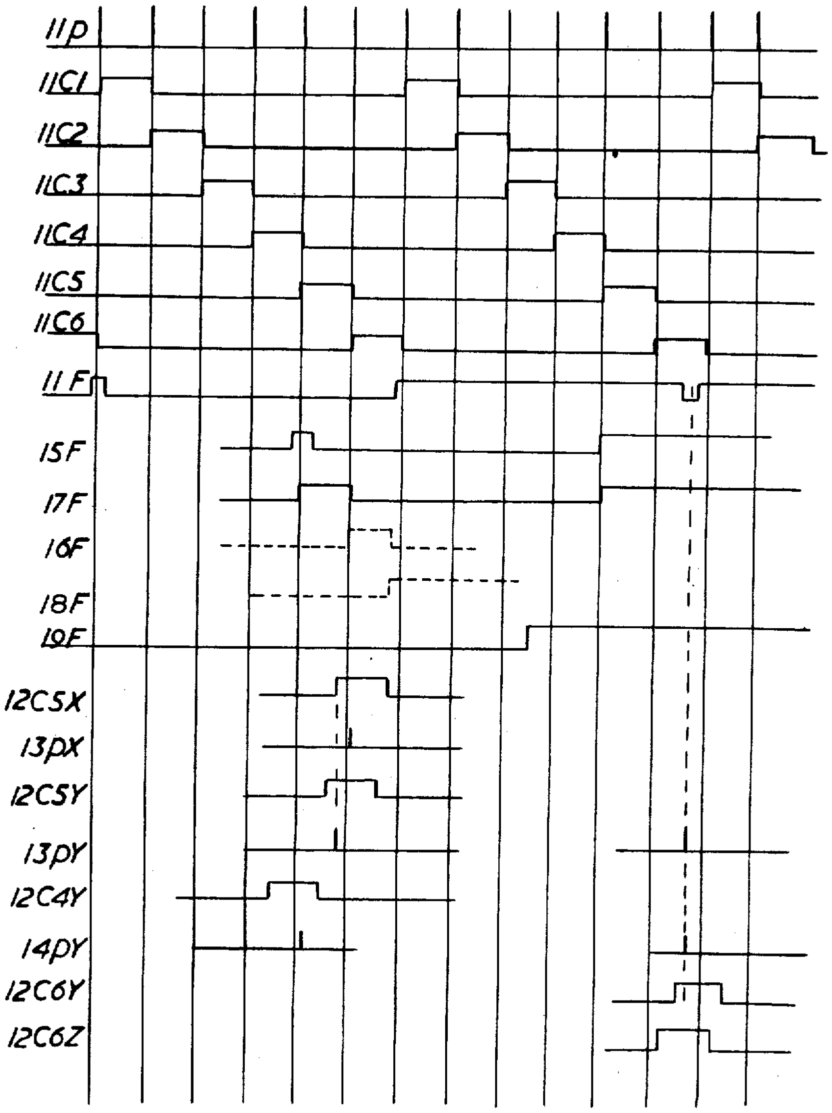
FIG. 2 is a timing diagram.

Referring now to FIG. 1 of the accompanying drawings, with reference to FIG. 2 when indicated for details of the waveform relationship, it is desired to transfer data stored in a first store, represented by the track 11DT of a magnetic tape 11T, to a second store, represented by the track 12DT of a magnetic drum 12D. The information on 11T is accompanied by a "clock-track" 11CT to which it is synchronised, and the drum carries a permanent "built-in" clock track 12CT from which all controls associated with the drum are derived. Reading heads 11RA and 11P read the data and clock tracks respectively of the tape, while 12P and 12W are reading and writing heads, respectively, for the clock and data tracks of the drum. The blocks 11RA, 11P, 12P, 12W are connected to associated amplifiers. 11C is a 6-way counter driven by clock pulses 11p derived from 11CT, and the 11C1–6 pulses form a continuous series of broad pulses, the 11p pulses being effective towards the end of each 11C pulse.

Triggers 11F–15F are operated by the received intelligence indicated by the controls **11*ra* derived from the reading head and amplifier 11RA in conjunction with selected ones of the 11C counter pulses and applied to a series of gates controlling the positions 1 of the triggers. The gates are shown as circles, the enclosed numbers being the number of effective controls required to open them. This process of applying received information to the triggers is continuous, and the controls for 12F, 13F, and 14F are comparable with those for 11F and 15F, being, in respect of 11C, 11*c*1, 11*c*2, 11*c*3** respectively.

12C is also a 6-way counter, driven by pulses **12*p* derived from the clock track 12CT of the receiving storage 12D, and these pulses are effective on the 0-side of 11F to 15F** to restore them after reading.

The **12*p* pulses are also used to derive pulses 13*p* and 14*p* having delays represented by 0.25 and 0.75 of the period between the 12*p* pulses, and durations approximately 5% of the repetition rate of the 12*p* pulses. The delay 12DL is sometimes short-circuited to cause 14*p* to appear with 13*p***.

In normal circumstances, with **18*f*1 conducting, the outputs of triggers 11F–15F are scanned at 14*p* by 12*c*6, 1, 2, 3 and 4, respectively, for applying inputs to the writing amplifier 12W** for the drum store.

The anomalous sequence for the 11C pulses is due to the use in the gates controlling 11F etc., of a so-called "master pulse technique," described in the copending application Serial No. 646,168 filed March 12, 1957, (now abandoned), which was originally filed in Great Britain, and matured into British patents numbered 861,124 and 861,125, granted to E. P. G. Wright, D. S. Ridler, and A. D. Odell, on June 7, 1961, whereby the output of a gate is made effective at the end of the coincidence of the controlling pulses. Thus, 11F is triggered to position 1 at the conclusion of the **11*c*6 pulse and is therefore effective in that position during the succeeding 11*c*1** pulse interval. This principle applies to all the gates and must be taken into account when considering the timing relationships in FIG. 2.

Triggers 16F to 19F are concerned with the control in the repetition rate. 16F inserts a control element in the sixth position before each group of 5 items which is transferred; 17F determines each time 12C effectively overtakes 11C; 18F controls whether or not the following item should pass to the writing amplifier; and 19F disables 17F from unwanted reset operations just after an overtake.

On the normal rotations of 11C, **17*f*1 is operated at the conclusion of 11*c*4 and reset by 13*p* during 12*c*5. 16*f*1 can conduct at the end of 11*c*5 if 17*f*1 is still conducting. However, 12C is constantly tending to catch up on 11C, and at those times when it has nearly done so, 17F is reset to 0 by 12*c*5 before 16*f*1 can conduct in response to 11*c*5. When 16*f*1 conducts, 18*f*1 will also conduct at the termination of 12*c*5; otherwise 18F stays in position 0, and on the next cycle of 12C, 19*f*1 conducts. While 19*f*1 is conducting, 17F, which will have been operated again at 11*c*4 to 17*f*1, will have no chance to reset to 17*f*0, and as a result, 16F will operate periodically (between 11*c*5 and 12*c*5) and 18*f*1 will conduct as 16*f*1 restores, and will stay conducting for a time. During this time, a number of items will be transferred from the buffer store 11F–15F to the drum store via 12W on the rotations of 12C, until a state is reached when 12C has advanced so far on 11C that 11*c*4 and 12*c*3 coincide, restoring 19F to position 0 and preparing 17F to reset at 12*c*5. Thereafter, each time that 12*c*5 conducts, 17F resets, and eventually, this will happen before 16*f*1 has time to conduct. When this happens, 18*f*1 also is prevented from conducting, and on the next cycle of 12C, no transfer via 12W takes place from 11F–15F. At 12*c*3 in this cycle, however, 19*f*1 re-operates to prevent a quick resetting of 17F from stopping transfers from the triggers, until 11*c*4 and 12*c*3 again coincide to reset 19F. By this time there will be no immediate chance of 17F being reset before 16F** operates.

Transfer from the buffer store is thus withheld for one cycle only of 12C.

It will be observed in FIG. 1 that 19F also controls the delay in the formation of the **14*p* pulses. With 19*f*0 conducting, there are two delays, namely 11DL and 12DL, whereas with 19*f*1 conducting, there is only the one delay 11DL, so that 14*p* and 13*p* are coincident. The purpose of this variation in timing is to provide a wide margin between the setting and resetting times of 11F–15F; as stated earlier, the delay 11DL represents approximately one quarter the repetition period of 12*p*, while 12DL** represents approximately one half this period.

FIG. 2 shows the relative timings. Pulses **11*p* and the cyclic conductance of 11*c*1–6 are evident. It is arranged that 11F has an opportunity to conduct at the conclusion of the 11*p* pulse while 11*c*6 conducts, and in the case of 15F it is while 11*c*4 conducts. 17*f*1 conducts when 11*c*4 ceases to conduct, in accordance with the principles earlier laid down, and 16*f*1 has a chance to conduct when 11*c*5 ceases; 18F follows 16F**.

Three timing points need consideration. Firstly the point when 12C overtakes 11C. The timing shown for **12*c*5X and 13*p*X gives an example just short of overtaking because 16F operates as 11*p* appears before 17F resets. In the case of 12C5Y and 13*p*Y, the greater relative advance of 12C causes 17F to reset before 16F** can operate.

The second point is to ensure that 12C has read correctly the last element before overtake. It can be seen that **12*c*4Y and 14*p*Y occur after 15F has been operated. In the previous case with 12*c*5X there would be more time available. Because 18F has not operated, no item is withdrawn, but it is necessary to ensure that 11F is read before the following item arrives. To take the worst case, it is necessary to assume that the speeds of 11C and 12C are practically the same. It can be seen that 12*c*6Y and 14*p*Y occur in time to restore 11F for the next item. If there is more difference in speed 12*c*6 will occur early as illustrated by 12*c*6Z which allows more margin. It should be observed that with 19*f*1 conducting, 14*p* has a short rather than a long delay. This change in timing will not upset the writing amplifier which will always accept an item on a trigger and write it on the following 14*p*** pulse.

Finally, in using a buffer store one character (i.e. one item of intelligence) long, care must be taken to ensure that, on starting transcription, the first character is not lost. Whether a character or a blank is inserted on the drum track depends upon the relationship of the tape clock track and the drum clock track during the reception and writing of the previous character. Hence, to get transcription started, the very first character from the tape cannot be used (or cannot be relied on), as the relationship between the two clock tracks determines whether the second character from the tape may be written immediately, or whether it must wait for the next drum character position. Provision must therefore be made for writing the first character on the tape as an unwanted character of some kind—duplicating the first effective character, inserting a spurious character, or just a "blank" character. The latter is to be preferred in practice. The extra character must, of course, be stored on the tape track with its own clock track, or its significance will be lost.

In certain circumstances, it might be desirable to use more than one buffer store, such as 11F–15F, and to progress the message, item by item, from store to store.

There are various ways in which the empty item positions can be guarded when the magnetic drum track is subsequently read. If the sixth element is used directly, it is necessary to know when transmission is commencing in order to provide the indicator for the first item. This can be achieved by a start condition emitted from the tape which is made a control of 17/1. It is also necessary that the item distributor knows where the intelligence starts and finishes. If the information is withdrawn, item by item, on each advancing step, the distributor needs to check that the next item is present and, if not, to make two steps. The end of the intelligence can be marked by two empty items.

It may be noted that the unused, or "disabled" character positions in the drum store can be used to good advantage for supervisory purposes because, although the marking on the control element may indicate that the character position in question does not form part of the text, yet this marking is nevertheless positively scanned and its recognition can be used to enable supervisory information to be inserted in the character position from some separate source.

The invention is not limited to the forms of storage described in the preferred embodiment, but is clearly applicable to other forms of store, such as the static magnetic matrix, ferro-electric matrix, cathode ray tube, and acoustic or magnetostrictive delay lines, and using series, or series-parallel forms of storage.

While the principles of the invention have been described above in connection with specific embodiments, and particular modifications thereof, it is to be clearly understood that this description is made only by way of example and not as a limitation on the scope of the invention.

What we claim is:

1. A data-processing system comprising first and second stores for storing items of intelligence, means for operating said stores at slightly different operational rhythms with the second store having a slightly faster operational rhythm than the first store, first and second cyclically operating counters coupled to said respective stores and cycling in rhythm therewith, said counters having corresponding pluralities of phase positions, a buffer store, means controlled by the said first counter for transferring items of intelligence stored in the first store to the buffer store in rhythm with the cycling of said first counter, means controlled by the second counter for transferring the items of intelligence which are in the buffer store in rhythm with the cycling of said second counter to the second store, and means for delaying the last-said transfer operation one complete cycle of the second counter each time said first and second counters pass through corresponding phase positions in time coincidence.

2. A data-processing system, as set forth in claim 1, wherein the said means for delaying comprises means controlled by said second counter for controlling the delay thereof.

3. A data-processing system, as set forth in claim 1, wherein said buffer store comprises a plurality of registers each capable of storing an individual element of an item of intelligence.

4. A data-processing system, as set forth in claim 3, wherein the individual elements of said items of intelligence are transferred to said buffer store element by element to respective registers therein.

5. A data-processing system, as set forth in claim 4, wherein the individual elements stored in said respective registers of said buffer store are transferred to said second store element by element.

6. A data-processing system, as set forth in claim 3, wherein each individual element of an item of intelligence is characterized by one of two conditions and wherein the said registers comprise bistable devices operable to one of said two conditions in response to said transfer of items of intelligence thereto.

7. A data-processing system, as set forth in claim 5, wherein said means for delaying includes means for comparing the phase positions of the said counters at a predetermined phase position of said first counter.

8. A data-processing system comprising first and second stores for storing items of intelligence, means for operating said stores at slightly different operational rhythms, with the second store having a slightly faster operational rhythm than the first store, first and second cyclically operating counters coupled to said respective stores and cycling in rhythm therewith, said counters having corresponding pluralities of phase positions, a buffer store, means controlled by the said first counter for transferring items of intelligence stored in the first store to the said buffer store in rhythm with the cycling of said first counter, means controlled by the second counter for transferring the items of intelligence which are in the buffer store to the second store in rhythm with the cycling of said second counter, and means for delaying the last-said transfer operation one complete cycle of the second counter, each time said phase position of said second counter approaches a corersponding phase position of said first counter, said means for delaying comprising means controlled by said second counter for controlling the delay thereof, said buffer store comprising a plurality of registers each capable of storing an individual element of an item of intelligence, the individual elements of said items of intelligence being transferred to said buffer store element by element to respective registers therein, said individual elements stored in said respective registers of said buffer store being transferred to said second store element by element, and said means for delaying further including means for comparing the phase positions of said counters at a predetermined phase position of said first counter, said means for comparing including a bi-stable register operable to one condition when the phase position of said first counter is in advance of that of said second counter and operable to a second condition when the phase condition of said second counter is in advance of that of said first counter.

9. A data-processing system, as set forth in claim 1, wherein said first store comprises a magnetic tape and wherein said second store comprises a magnetic drum.

10. A system for transferring data between storage systems having slightly different operating frequencies, without the use of large scale off-line buffer storage units, comprising:

a first store;

first timing means coupled to first store for producing a first series of periodic timing signals defining the time positions of successive bits of data stored in said first store;

a second store;

second timing means coupled to said second store for producing a second series of periodic timing signals defining the time positions of successive bits of data stored in said second store and corresponding to but at a slightly higher frequency than said first series;

a buffer store having a small capacity in relation to the capacities of said first and second stores;

first gating means coupled to said first timing means for cyclically distributing intelligence signals from said first store into the stages of said buffer register in synchronism with said first series of timing signals;

second gating means coupled to said second timing means for cyclically scanning said buffer store in synchronism with said second series of timing signals; and control means coupled to said first and second timing means and to said second gating means for blocking operation of said second gating means during one scanning cycle of said second gating means upon the occurrence of a predetermined phase coincidence condition between said first and second timing signals.

11. An on-line system for handling intelligence comprising: a first store having a characteristic operating rhythm and a characteristic arrangement of intelligence stored therein, said characteristic arrangement comprising the storage of intelligence bits in groups each group consisting of a predetermined number of consecutive bits of intelligence, successive groups being separated by a predetermined number of spacing bits; a second store having a characteristic operating rhythm slightly more rapid than that of said first store; a buffer store having the capacity to store one group of intelligence bits from the said first store; first means coupled between said first store and said buffer store for transferring intelligence groups from said first store to said buffer store in the characteristic operating rhythm of said first store; second means coupled between said buffer store and said second store and operative concurrently with said first means for transferring intelligence groups from said buffer store to said second store in the said slightly more rapid characteristic operating rhythm of said second store, while inserting predetermined indicating signal bits, between successive groups, corresponding to the spacing bits between groups in said first store; comparison means coupled to said first and second means for detecting a predetermined phase coincidence in the rhythmic operations of said stores; and means coupled to said comparison means for altering the next indicating signal inserted in said second store following the occurrence of said predetermined phase coincidence, whereby the said next indicating signal in said second store is indicative of a blank group storage space.

References Cited in the file of this patent

UNITED STATES PATENTS

| | | |
|---|---|---|
| 2,916,210 | Selmer | Dec. 8, 1959 |
| 3,059,221 | Page et al. | Oct. 16, 1962 |